April 4, 1967  A. E. BRATT  3,312,458
BEARING BETWEEN TWO RELATIVELY OSCILLABLE MEMBERS
FOR OSCILLATING MOVEMENT
Filed Feb. 4, 1964  2 Sheets-Sheet 2

INVENTOR:
AXEL ERLAND BRATT
BY Howson & Howson
ATTYS.

United States Patent Office 3,312,458
Patented Apr. 4, 1967

3,312,458
BEARING BETWEEN TWO RELATIVELY OSCIL-
LABLE MEMBERS FOR OSCILLATING MOVE-
MENT
Axel Erland Bratt, Molndal, Sweden, assignor to Aktie-
bolaget Svenska Kullagerfabriken, Goteborg, Sweden,
a corporation of Sweden
Filed Feb. 4, 1964, Ser. No. 342,557
Claims priority, application Sweden, Feb. 21, 1963,
1,880/63
9 Claims. (Cl. 267—1)

The present invention relates to a bearing between two relatively oscillable members for oscillating movement having at least three sets of blade springs. The invention is characterized mainly thereby that the blade springs are disposed substantially parallel to the axis of oscillation of the said members and that one spring of each set is connected with one of the said members and another spring in the same set is connected with the other of said members and further thereby that the springs in each set are connected to each other at at least one end thereof.

More specifically according to the present invention, the connection between the members comprises a number of spring blades arranged in pairs which are equiangulary spaced about the selected or predetermined axis, there being at least three pairs of blades, one blade of each pair being connected to one of the members and the other blade of each pair being connected to the other member. Further, the spring blades of each pair are connected together by at least one connecting piece, the axial location of a connection between a blade and a connecting piece being spaced from the axial location of the connection between the blade and the member and the connecting piece being so disposed in relation to the connections between the blades and the members that axial movement in the system, caused by flexing of the blades during relative angular movement of the members results in bodily axial movement of the connecting piece without relative axial movement between the members.

A bearing of this kind is especially suitable when the angle of oscillation is comparatively small. An advantage of the device as compared to known bearings of similar type is that the members when oscillating move absolutely concentrically in a single plane perpendicular to the axis of oscillation.

The invention may be employed in machine tools, for example for mounting angularly oscillating parts on a fixed part of the machine, or in precision instruments, such as measuring and control instruments, governors and the like and may also be used in pivot bearings for larger machines.

Figures 1, 2:
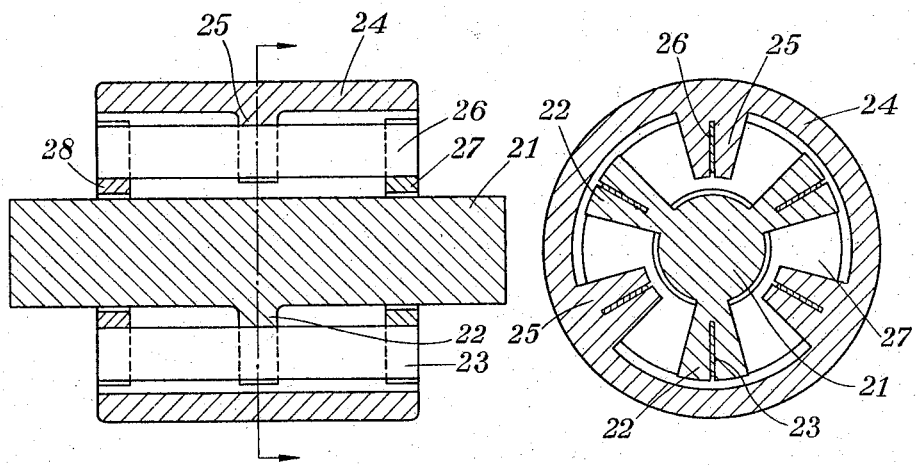

The invention is more fully described in the following in connection with a number of examples of forms thereof as shown on the accompanying drawings, on which FIGS. 1 and 2 show an axial section and a cross section respectively of a bearing for oscillating movement. Corresponding sections through four other forms of the invention are shown in FIGS. 3 and 4, 5 and 6, 7 and 8 and 9 and 10 respectively.

The embodiment of the invention shown in FIGS. 1 and 2 comprises two members 21, 24 which as illustrated are coaxial inner and outer cylinders, and which are connected by a spring blade arrangement with freedom for limited relative angular movement about a selected axis which in this embodimtnt is the common axis of the cylinders.

FIGS. 1 and 2 show a bearing for oscillating movement comprising an axle 21 and an outer bearing ring 24. The axle 21 is provided with three outwardly extending projections 22, while the outer ring 24 has three inwardly directed projections 25. The projections 22 and 25 are provided with slots extending in an axial direction and radially outwards or inwards respectively. Blade springs 23 and 26 are mounted in the slots in the projections 22 and 25 respectively and are connected at their respective ends with a pair of rings 27 and 28. The cylinders 21 and 24 in this embodiment of the invention are interconnected by three sets of blades, each of which comprises a pair of blades 23, 26 disposed parallel to the axis and lying in angularly offset planes which contain the axis. Blades 23, 26 are distributed equiangularly around the axis.

Each blade 23 is secured about mid length to an outward projection 22 on the member 21, as by being inserted in the slot in the projection 22, and each blade 26 is likewise secured to an inward projection 25 on the outer member 24. At their ends, that is at points remote from the position where they engage the projections 22, 25 the blades 23, 26 are secured together by having their ends inserted into and secured for example by means of soldering in slots in axially thick rings 27, 28. The blades 23, 26 and two adjacent slots may be considered as a set. Upon relative turning movement between the axle 21 and the outer ring 24 the springs 23 will flex in one direction and the springs 26 in the other direction, and the rings 27 and 28 will be drawn slightly inwards towards the middle of the bearing, but there will be no relative axial movement between the outer ring and the axle. Further relative turning movement between outer ring and axle will be stopped when the projections 22 and 25 come into contact with each other. The form illustrated in FIGS. 1 and 2 permits of a turning. The number and size of the projections employed in any embodiment depends upon the load to be carried by the members since the load must be transferred to the discs 27, 28 via the blade springs. Tests have shown that a minimum of three sets, that is, six blades, is preferred in any practical embodiment of the invention.

Figures 3, 4:
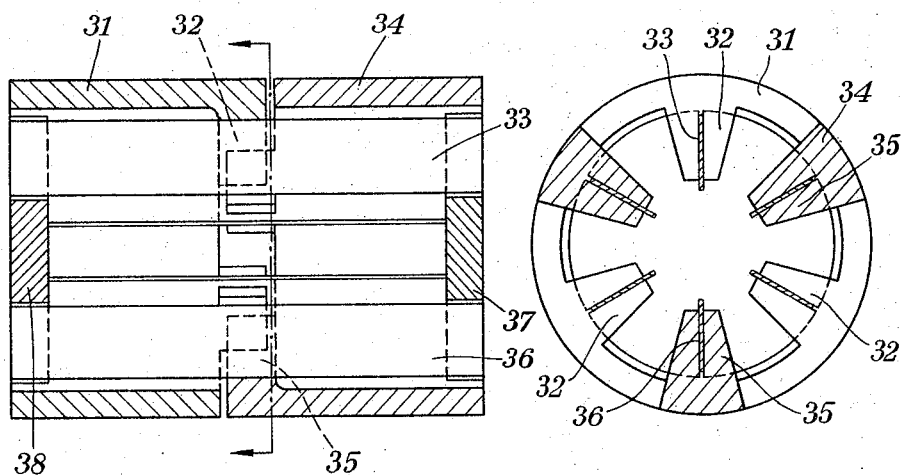

In certain cases it may be found desirable to locate the two relatively oscillable members axially adjacent each other and that they have the same outer diameter. A form of a device of this kind is shown in FIGS. 3 and 4. The bearing device consists of two sleeve-shaped bearing members 31 and 34 having the same outer and inner diameters. Each bearing member is provided with three inwardly directed projections 32 and 35 of which those on one of the members extend axially in between those of the other member. The projections are provided with slots for axially extending blade springs 33 and 36. The respective ends of these springs are interconnected by a pair of circular disks 37 and 38 thereby that the ends of the springs are inserted in slots provided in the disks where they are fixed, for example by soldering or by means of a suitable adhesive. A bearing device of the above described kind is mounted by pressing one bearing member 31 or 34 into a fixed machine part, and the machine part, which is to oscillate, is mounted on the other of the two bearing parts. When the bearing parts are turned relative each other the springs 33 and 36 will be flexed elastically as when a bow is bent. The disks 37 and 38 will then be drawn slightly closer to each other. During the oscillating movement the disks will thus move axially inwards and outwards in synchronism with the oscillating movement.

This embodiment could be used, for example, as a connecting device between a fixed machine part and an oscillating machine part; one of the members could be secured to the fixed machine part as by being pressed into a suitable hole in the part, and the oscillating part could be secured to the second member in a similar manner by any other suitable means.

Figure 5:
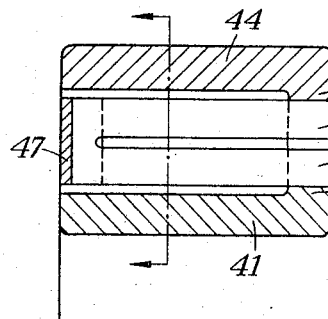
Figure 6:
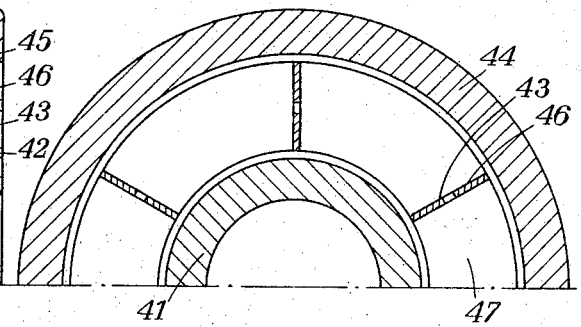

A form of the invention somewhat resembling an ordinary rolling bearing is shown in FIGS. 5 and 6. The inner ring 41 of the bearing is provided with a flange 42 having slots into each of which is fitted one arm 43 of a U-shaped spring, the other end or bow thereof being fixed to a ring 47. The other arm 46 is in a similar manner fixed to a flange 45 on an outer ring 44. This form of the invention functions in a manner similar to that described above, i.e. it permits of an oscillating movement while the ring 47 carries out a reciprocating movement synchronized therewith.

In operation, rotation of the members 41, 44 relative to one another causes the limbs 43, 46 of each set to bend in opposite directions, the end connection being maintained in substantially the same plane relative to the axis by means of the stiffening ring 47. Similar to the first two embodiments bending of the blades causes the discs to be drawn towards the center of the mounting, and oscillating movement of the members relative to each other causes the disc to perform an axial reciprocating movement, while the members retain the same relatively axial position. The maximum angle of relative rotation of the members is limited by the maximum permissive angle of deflection of the blades 43, 46 from the plane containing the axis of rotation.

Figure 7:
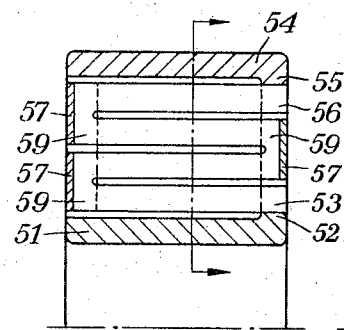
Figure 8:
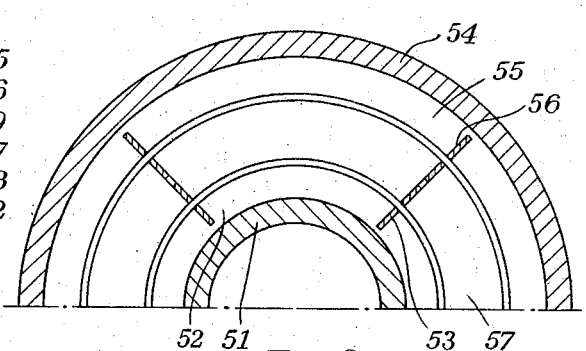

FIGS. 7 and 8 show a form of the invention which in principle resembles the bearing according to FIGS. 5 and 6. The main difference is that the former may be said to be a multiple stage bearing which permits of an oscillating movement between the outer ring 54 and the inner ring 51 through an angle three times as great as that of the form of FIGS. 5 and 6. The springs are in this case zig-zag shaped, and their end portions 59 are connected by rings 57. The free ends 53 and 56 of the springs are fixed to flanges 52 and 55 on the bearing rings 51 and 54 respectively.

This embodiment of the invention functions in a manner similar to that shown in FIGS. 5 and 6. However, the advantage gained in accordance with this embodiment is of the maximum angle of relative rotation of the members three times that of the previous embodiment. Thus, in this case the maximum angle of relative rotation of the members is limited by the sum of maximum permissible angles of deflection from the plane containing the axis of each pair of adjacent blades.

Figure 9:
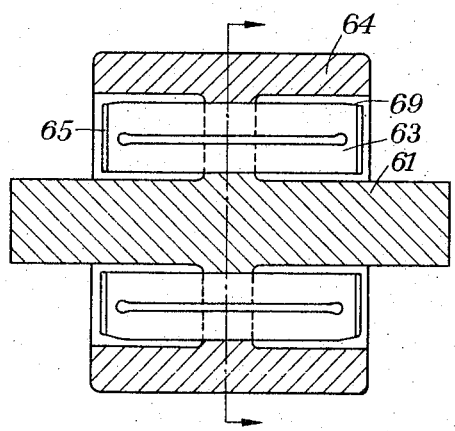
Figure 10:
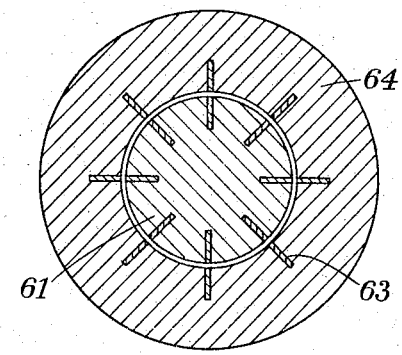

FIGURES 9 and 10, finally, show a bearing which differs from the other types of bearing described above thereby that the ends 63 of the springs are not interconnected with each other by means of an annular member. In order to stiffen the ends they may be bent at an angle as shown at 65. The corners 69 of the springs turned towards the outer ring 64 of the bearing are cut off to prevent them from coming into contact with the outer ring during turning relative to the inner bearing member 61.

The operation of the embodiment of FIGS. 9 and 10 is very similar to that of FIGS. 1 and 2. Relative oscillation of the members causes the blades 63, 66 to flex in opposite direction and induces the end connection 68 to perform an axial reciprocating motion. The important advantage to be gained from this type of mounting is that the relative movement of the rotatable members is purely angular, that is, the members maintain the same relative axial position throughout the cycle of oscillation. In this respect it is particularly useful for systems requiring only small angles of relative rotation. It can be employed to advantage in many precision instruments for example measuring and control instruments, where it has the advantage that it is frictionless and substantially free from play. It can also be employed as a pivot bearing in large machines.

The forms of the invention described above are substantially frictionless and free from play. They are thus particularly useful in various kinds of precision instruments, such as measuring and control instruments, governors and the like, but they may also be used in larger sizes, for example as pivot bearings in machines. The term "blade springs" used above is to be deemed to include all types of springs functioning in a manner similar to those described. The springs need not necessarily be made of steel or metal but may be made of plastic, either alone or reinforced.

I claim:

1. Means mounting a pair of members to permit limited angular movement about a predetermined axis comprising a plurality of spring blades arranged in at least three equiangularly spaced pairs about the predetermined axis, one blade of each pair being connected to one of the members and the other blade of each pair being connected to the other member, at least one connecting piece connecting the spring blades of each pair, the axial location of a connection between a blade and a connecting piece being spaced from the axial location of the connection between the blade and a member, and said connecting piece being so disposed in relation to the connections between the blades of the members so that axial movement in the system caused by the flexing of the blades during relative angular movement of the members results in axial movement of the connecting piece without relative axial movement between the members.

2. Mounting means as claimed in claim 1 wherein the blades of a pair are contained in angularly offset planes which contain the predetermined axis.

3. Mounting means as claimed in claim 1 wherein the blades of each pair are coplanar and radially spaced in a plane passing through the predetermined axis.

4. Mounting means as claimed in claim 1 wherein the baldes of at least one pair are formed in one piece which is U-shaped, the terminal ends of the arms of the U-shaped member being connected to the members and the base of the U-shaped member forming a connecting piece which is integral with the blade.

5. Mounting means as claimed in claim 1 wherein each pair of blades is connected by a generally U-shaped connecting piece which is coplanar with the blades and disposed between them, one end of each blade being connected to the adjacent member and the other end of each blade being connected to the end of the adjacent free arm of the U-shaped connecting piece so that the blades and connecting piece present a zig-zag appearance when viewed in side elevation.

6. Mounting means as claimed in claim 5 wherein each pair of blades and connecting piece are formed in one piece by radially spaced slots extending alternately from one end of the piece and the other end along the greater part of the length of the piece.

7. Mounting means as claimed in claim 1 wherein the blades are connected at points between their ends to the members and are connected together at both ends.

8. Mounting means as claimed in claim 1 wherein the members are cylindrical and concentrically oriented one within the other, the blades being accommodated in an annular space between the members.

9. A mounting means as claimed in claim 1 wherein the members are cylindrical and connected by the blades in coaxial end to end relation.

References Cited by the Examiner

UNITED STATES PATENTS

| | | |
|---|---|---|
| 166,592 | 8/1875 | Duvall. |
| 942,819 | 12/1909 | Foss. |
| 1,085,731 | 2/1914 | Hafner. |
| 1,673,959 | 6/1928 | Wallgren. |
| 1,865,330 | 6/1932 | McLeod. |
| 1,893,452 | 1/1933 | Stondage. |
| 1,952,970 | 3/1934 | Brofeth. |
| 2,181,537 | 11/1939 | Schmitter _____ 64—32 |
| 2,479,278 | 8/1949 | Tessendorf _____ 64—32 |
| 3,181,918 | 5/1965 | Troeger _____ 308—2 |
| 3,184,928 | 5/1965 | Desai _____ 308—2 X |

FOREIGN PATENTS 660,597   12/1936   Germany.

ARTHUR L. LA POINT, *Primary Examiner.*

DAVID J. WILLIAMOWSKY, *Examiner.*

L. L. JOHNSON, R. M. WOHLFARTH,
*Assistant Examiners.*